July 13, 1943.  R. M. HEINTZ  2,324,158
ARMATURE CONSTRUCTION
Filed March 11, 1942  2 Sheets-Sheet 1
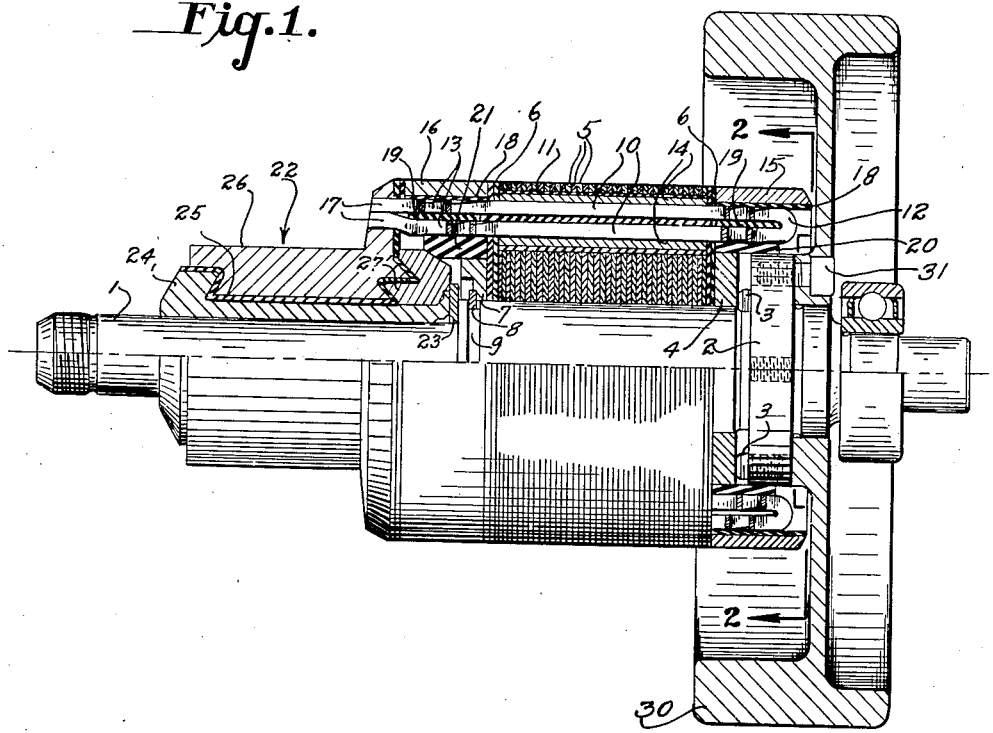
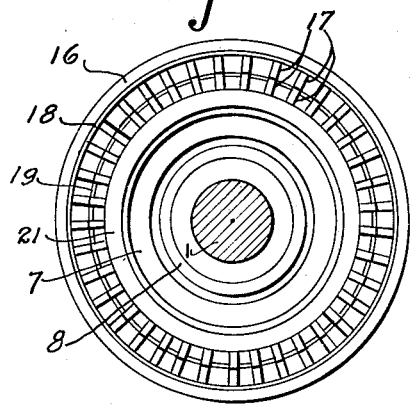
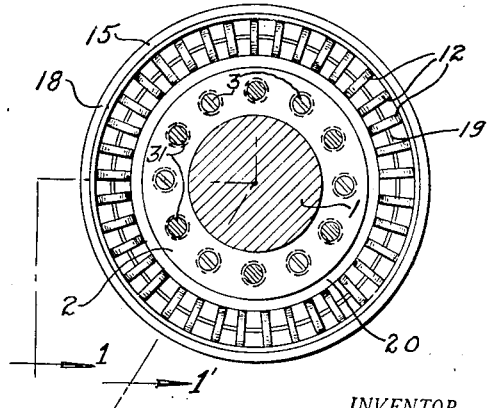
INVENTOR.
RALPH M. HEINTZ.
BY
Frank H. Harmon
ATTORNEY.

July 13, 1943.                R. M. HEINTZ                 2,324,158
                        ARMATURE CONSTRUCTION
                        Filed March 11, 1942          2 Sheets-Sheet 2
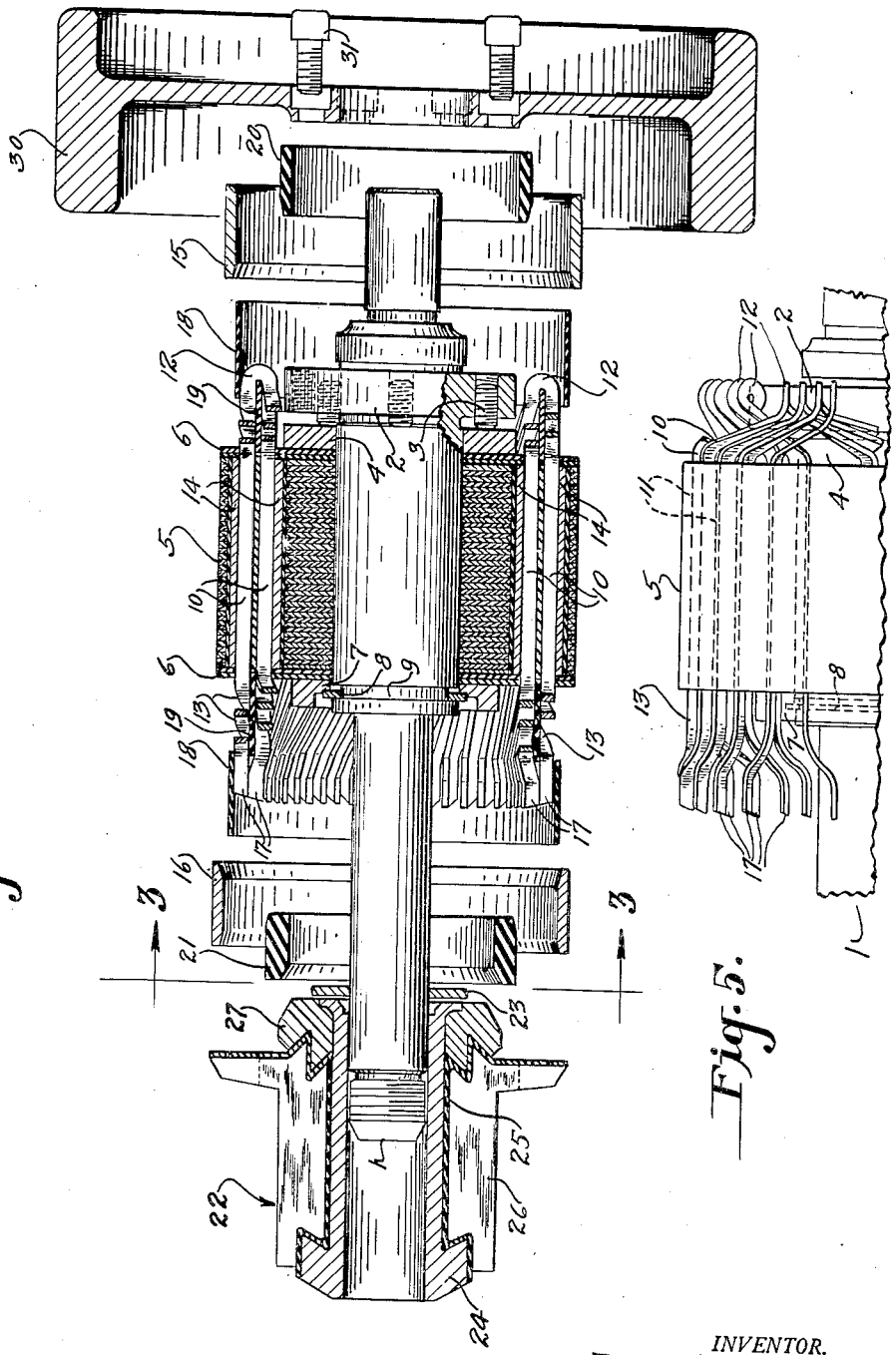
INVENTOR.
RALPH M. HEINTZ.
BY
Frank H Harmon
ATTORNEY.

Patented July 13, 1943

2,324,158

UNITED STATES PATENT OFFICE 2,324,158

ARMATURE CONSTRUCTION

Ralph M. Heintz, Cleveland, Ohio, assignor to Jack & Heintz, Inc., Cleveland, Ohio Application March 11, 1942, Serial No. 434,236

8 Claims. (Cl. 171—206)

This invention relates to an improved construction for the armatures of electric motors and the like.

The general object of the invention is to provide an armature of simplified construction which will be exceptionally rugged and capable of withstanding extremely high rotational speeds.

A primary object is to provide a novel and improved method for securing the end turns of armature conductors against movement to enable operation at higher rotational speeds than have heretofore been permissible.

A further object is to provide an improved method of making an armature so as to increase the rigidity of the securing means for those portions of the conductors extending beyond the rotor laminations, for extremely high speed rotation.

A still further object is to provide a novel arrangement of parts for preventing movement of the end turns of the conductors and the disturbing of the balance of an armature under extremely high rotational speeds.

In a high speed motor or the like means must be provided for securing the end turns of the armature conductors to prevent deformation or movement under the high order of stresses developed. Heretofore it has been customary to wind wire or other binding material over the end turns for this purpose. This expedient has proved adequate for normal speeds, but the trend toward extremely high speeds in certain classes of motors for special purposes has resulted in armature speeds far exceeding the safe limits of conventional design. At extremely high speeds, accompanied by a high degree of temperature rise, the customary wire wrapping, or binding, tends to loosen and permit movement of the conductors, disturbing the fine balance of the armature. The present invention overcomes this difficulty by providing a novel arrangement of parts and an improved method of assembling same so as to render the armature safely capable of speeds and temperatures far in excess of those permissible with armatures of conventional construction. Instead of applying a flexible external binding compressively over the end turns to hold them down, the present invention involves the application of relatively rigid internal wedge members to wedge the end turns radially outwardly against rigid encircling bands. Both the wedge members and the bands being rigid, ring-like members, and the wedging action being exerted outwardly, in the same directions as the centrifugal forces of rotation, there is found to be substantially no movement of the parts, even when subjected to extremely high speed rotation. The specific arrangement of the parts, and method of assembling a preferred embodiment, will be described in greater detail with reference to the accompanying drawings in which:

Figure 1 is a longitudinal view of a motor armature embodying the principles of the present invention, the commutator and rotor laminations being shown in partial section on the line 1—1 of Figure 2, and the flywheel end of the armature being shown in section on the line 1—1' of Fig. 2;

Figure 2 is a sectional view taken on the line 2—2 of Figure 1;

Figure 3 is a view taken on the line 3—3 of Figure 4;

Figure 4 is an exploded view, in longitudinal section, of the armature illustrating the relation of the parts and the sequence of the final steps in assembling the same; and Figure 5 is a fragmentary side elevation view showing a number of armature conductors in place and projecting from the rotor laminations before the retaining bands and wedge rings are applied.

The drawings illustrate the principles of the invention applied to the construction and assembling of the armature of a starting motor for airplane engines and the like. The starting motor is of the so-called inertia type having a flywheel on the armature shaft adapted to be rotated at speeds of twenty thousand to thirty thousand revolutions per minute to store sufficient energy for starting the engine through suitable reduction gearing upon engagement of clutch means between said gearing and the engine. It is to be understood, however, that the invention is applicable to armatures generally, without regard to the nature of the mechanisms associated therewith, and irrespective of the inclusion or omission of the flywheel.

The construction of the armature will now be described according to the method of assembling the same, the various parts being mentioned in the order in which they are assembled. The numeral 1 indicates an armature or rotor shaft having an integral flange 2 thereon. A plurality of set screws 3 in the flange 2 serve to position a clamping ring 4 upon which may be stacked splined rotor laminations 5 and insulating laminations 6. A clamping ring 7, retained in place by a snap ring 8 engaging a groove 9 in the shaft, serves as an abutment against which the stack of laminations may be tightly clamped by means of the set screws 3. The armature conductors 10 may then be inserted in conductor slots 11 together with wedges 14 and the necessary insulation.

The conductors 10 in the present embodiment comprise bars of copper preformed into a general U-shape having spaced legs insertible in correspondingly spaced slots. The bend in the U in each conductor constitutes an end turn 12 projecting unsupported, at this stage of the assembling, beyond the end of the stack of laminations 5, and end portions 13 project unsupported from the other end of the stack. Figure 5 is a fragmentary view of an armature at this stage in the assembling, showing a number of the U-shaped conductors in place in the assembled stack of rotor laminations.

When the assemblage shown in Figure 5 is completed, an insulating band 18 and a metallic, non-magnetic band 15 may be placed over the ring of end turns 12; and a similar insulating band 18 and metallic band 16 may be placed over the ring of end portions 13 in the manner shown, leaving tips 17 projecting beyond the band 16 for connection with commutator bars. The end turns 12 are then wedged outwardly against the band 15 by means of an annular tool inserted axially of the armature. Upon withdrawal of the tool, the ring of end turns tend to spring back to their original positions, but retain a sufficient degree of set to facilitate introduction of a wedge ring 20 which may be pressed into position as shown. The wedge ring 20 is of such dimensions as to require the application of considerable force in inserting it between the end turns 12 on its outside and the flange 2 and the clamp ring 4 on its inside. On the other end of the stack of laminations an annular tool is inserted to spread the end portions 13 outwardly against the band 16, the tool is withdrawn, and a wedge ring 21 is pressed in between the inner ring of end portions 13 and the clamp ring 7. Both wedge rings 20 and 21 may be made of Bakelite or the like and slightly tapered to exert a wedging action outwardly against the conductors as the rings are pressed into place. Alternatively, the wedge rings may be made of metal and suitable insulation provided between these rings and the conductors. Insulating rings 19 separate the concentric rings of projecting conductor portions at the two ends of the rotor.

A commutator, indicated generally at 22, may then be moved into place abutting a spacing washer 23. Commutator 22 comprises a rivet 24 supporting the usual plurality of commutator bars 26 with insulation 25 between the rivet and the bars and also between adjacent bars. The commutator elements are locked into proper relationship on the rivet by means of the commutator clamp ring 27. The securing of the rivet 24 on the shaft 1 and the connecting of the conductor tips 17 to the various commutator bars are carried out in the customary manner well understood in the art. On the other end of the armature a flywheel 30 may be attached to the flange 2 by means of screws 31.

By virtue of the arrangement of parts and method of construction herein described, those parts of the armature conductors which are unsupported by the rotor laminations are wedged outwardly in the directions of the centrifugal forces under considerably pre-stress against the relatively rigid bands 15 and 16, thereby preventing any subsequent movement of the parts in the operation of the motor. The armature is therefore capable of exceptionally high rotational speeds without deleterious effects.

The steps in the method of making an armature in the manner described are best visualized by referring to Figures 4 and 5. Figure 5 shows the manner in which the conductors are inserted in the clamped stack of rotor laminations with the end portions of the conductors projecting unsupported from both ends of the stack. The exploded view in Figure 4 then illustrates the laminated rotor core on the shaft 1 with all the conductors in place and in a position to receive the insulation rings 18, the retaining bands 15 and 16, the wedge rings 20 and 21, the spacing washer 23, the commutator 22, and the flywheel 30, in the order named, it being remembered that the method as described does not contemplate the placing of all the parts on the shaft at the same time, as shown. Figure 4 is intended to show the relation of the various parts and the order in which they are to be assembled, rather than the actual performance of the method.

The above description and the accompanying drawings are to be interpreted as illustrative only, and not in a limiting sense. The invention is to be limited only by the prior art and the scope of the appended claims.

I claim:

1. The method of making an armature comprising the steps of inserting conductors in conductor slots in a prepared stack of armature laminations so as to leave a ring of end portions of said conductors protruding from said slots, applying a rigid annular band over said ring of end portions so that the tips of said end portions extend beyond said band for connection with commutator elements, and then pressing a rigid annular wedging member within said ring to wedge said end portions firmly against said band.

2. The method of making an armature comprising the steps of inserting conductors in conductor slots in a prepared stack of armature laminations so as to leave a ring of end portions of said conductors protruding from said slots, applying a rigid annular band over said ring of end portions so that the tips of said end portions extend beyond said band for connection with commutator elements, inserting a tool within said ring of end portions to spread same outwardly against said band, removing said tool, and then pressing a rigid annular wedging member within said ring to wedge said end portions firmly against said band.

3. The method of making an armature comprising the steps of inserting conductors in conductor slots in a prepared stack of armature laminations so as to leave a ring of end portions of said conductors protruding from said slots at each end of said stack, applying an open end rigid annular band over said ring of end portions at each end of said stack, and then pressing a rigid annular wedging member within each of said rings to wedge said end portions firmly against said bands.

4. The method of making an armature comprising applying clamping rings to the ends of a stack of armature laminations on a shaft, inserting conductors in said stack with end portions of said conductors protruding from the ends of said stack in rings spaced from said clamping rings, applying rigid annular bands over said end portions, and inserting rigid annular wedging members between said clamping rings and said end portions to wedge said end portions firmly against said bands.

5. The method of making an armature comprising applying clamping rings to the ends of a stack of armature laminations on a shaft, inserting conductors in said stack with end portions of said conductors protruding from the ends of said stack in rings spaced from said clamping rings, applying rigid annular bands over said end portions, inserting a tool between said clamping rings and said end portions to spread said end portions outwardly against said band, removing said tool and inserting rigid annular wedging members between said clamping rings and said end portions to wedge said end portions firmly against said band.

6. An armature comprising a laminated rotor, conductors in said rotor having end portions projecting therefrom, a rigid open end annular band encircling said end portions, and a rigid annular wedging member spaced from said band and wedging said end portions firmly against said band.

7. An armature comprising a stack of rotor laminations on a shaft, clamping rings for holding said stack together, armature conductors projecting from opposite ends of said stack, rigid annular bands encircling said projecting conductors, said bands having open ends to facilitate commutator connections and rigid annular wedging members between said clamping rings and said projecting conductors to wedge the latter firmly against said bands.

8. In an armature, a stack of rotor laminations on a shaft, clamping rings on said shaft for compressing said stack, armature conductors projecting from the ends of said stack and overhanging said clamping rings, rigid annular bands encircling said projecting conductors, and rigid annular wedging members bearing against peripheral portions of said clamping rings for wedging said projecting conductors outwardly against said bands.

RALPH M. HEINTZ.